United States Patent
Zhong et al.

(10) Patent No.: US 8,801,965 B2
(45) Date of Patent: Aug. 12, 2014

(54) LIQUID CRYSTAL MEDIUM COMPOSITION AND LIQUID CRYSTAL DISPLAY PANEL MANUFACTURED WITH SAME

(71) Applicant: Shenzhen China Star Optoelectronics Technology Co., Ltd., Shenzhen (CN)

(72) Inventors: Xinhui Zhong, Shenzhen (CN); Kuancheng Lee, Shenzhen (CN)

(73) Assignee: Shenzen China Star Optoelectronic Technology co., Ltd., Shenzhen, Guangdong (CN)

( * ) Notice: Subject to any disclaimer, the term of this patent is extended or adjusted under 35 U.S.C. 154(b) by 18 days.

(21) Appl. No.: 13/806,830

(22) PCT Filed: Nov. 14, 2012

(86) PCT No.: PCT/CN2012/084615
§ 371 (c)(1),
(2), (4) Date: Dec. 24, 2012

(87) PCT Pub. No.: WO2014/056272
PCT Pub. Date: Apr. 17, 2014

(65) Prior Publication Data
US 2014/0098314 A1    Apr. 10, 2014

(51) Int. Cl.
*C09K 19/52*     (2006.01)
*C09K 19/06*     (2006.01)
*C09K 19/34*     (2006.01)
*C09K 19/30*     (2006.01)
*C09K 19/12*     (2006.01)
*C09K 19/00*     (2006.01)
*C09K 19/02*     (2006.01)
*C09K 19/54*     (2006.01)
*G02F 1/1333*   (2006.01)

(52) U.S. Cl.
CPC ............. *C09K 19/54* (2013.01); *G02F 1/1333* (2013.01)

USPC ............. 252/299.01; 252/299.6; 252/299.61; 252/299.63; 252/299.66; 428/1.1; 428/1.2; 428/1.28; 349/42; 349/92; 349/108; 349/183

(58) Field of Classification Search
USPC ............... 252/299.01, 299.6, 299.61, 299.63, 252/299.66; 428/1.1, 1.2, 1.28; 349/42, 92, 349/108, 183
See application file for complete search history.

(56) References Cited

U.S. PATENT DOCUMENTS 5,843,333 A * 12/1998 Hakemi ................. 252/299.5
6,106,906 A * 8/2000 Matsuda et al. ............. 428/1.2

FOREIGN PATENT DOCUMENTS

| CN | 101023502 A | 8/2007 |
|---|---|---|
| CN | 102660300 A | 9/2012 |
| JP | 2006078877 A | 3/2006 |

* cited by examiner

*Primary Examiner* — Geraldina Visconti
(74) *Attorney, Agent, or Firm* — Andrew C. Cheng (57) ABSTRACT

The present invention provides a liquid crystal medium composition and a liquid crystal display panel manufactured with same. The liquid crystal medium composition includes a negative type liquid crystal material, a polymerizable monomer, a sensitizer, and stabilizer. The sensitizer is an organometallic complex that has an amount of 0.01%-5% of total mass of the liquid crystal composition and has a strong absorption of ultraviolet light having a wavelength of 300-450 nm. The sensitizer converts the primary wavelength range of ultraviolet light for reaction of the polymerizable monomer from 200-300 nm to 300-450 nm, staying away from the absorption band of the liquid crystal material and reducing damages caused on the liquid crystal material and the alignment material of polyimide, thereby heightening reaction efficiency and homogeneity of the polymerizable monomer and the quality and lifespan of the liquid crystal display panel.

11 Claims, 2 Drawing Sheets

LIQUID CRYSTAL MEDIUM COMPOSITION AND LIQUID CRYSTAL DISPLAY PANEL MANUFACTURED WITH SAME

BACKGROUND OF THE INVENTION

1. Field of the Invention

The present invention relates to the field of liquid crystal displaying techniques, and in particular to a liquid crystal medium composition, a liquid crystal display panel manufactured with same.

2. The Related Arts

In the business of LCD (Liquid Crystal Display), the recently developed polymer stabilized vertical alignment (PSVA) technique shows various advantages, such as wide viewable angle, high contrast, and fast response, over the traditional twisted nematic (TN) and super twisted nematic (STN) techniques. As compared to other vertical alignment (VA) techniques, such as multi-domain vertical alignment (MVA) and patterned vertical alignment (PVA), PSVA shows advantages in respect of transmittance and simplified process. As a result, PSVA is the current main stream of the contemporary TFT-LCD business.

Figure 1:
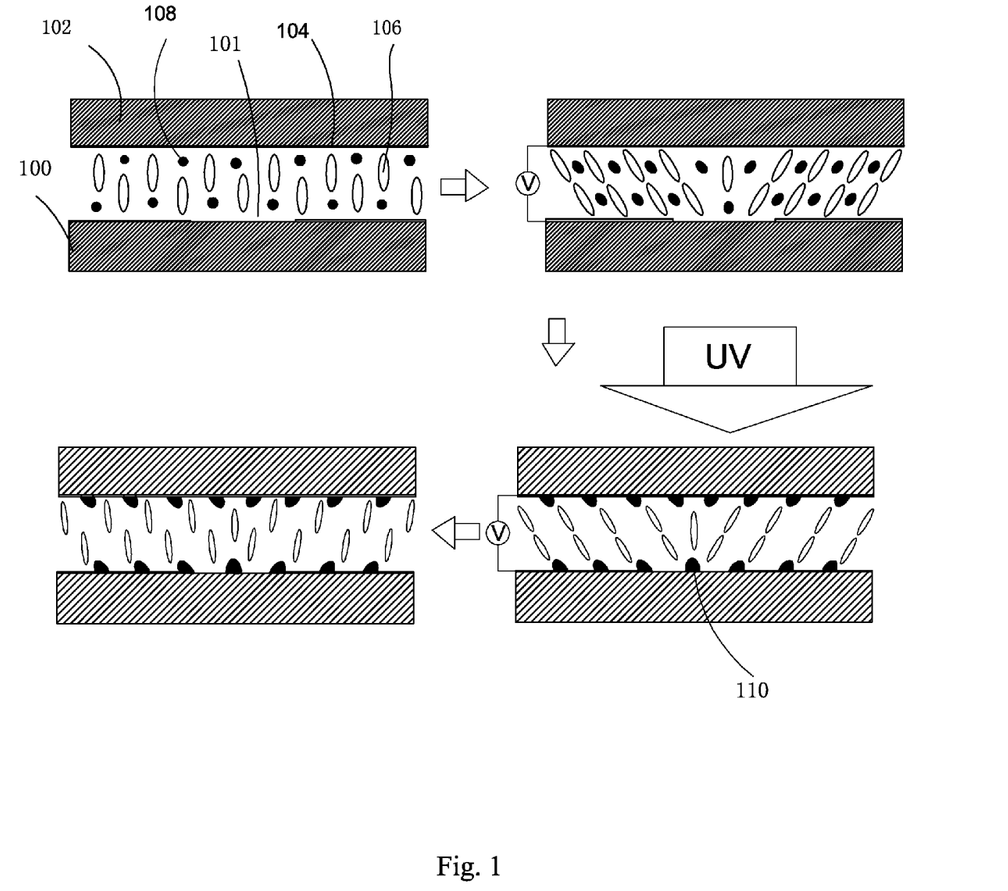
FIG. 1 is a schematic view illustrating alignment of liquid crystal in a liquid crystal display device manufactured with a conventional polymer stabilized vertical alignment technique.

In a key process of manufacturing PSVA, as shown in FIG. 1, the PSVA technique uses a negative liquid crystal material. When no electric field is applied, liquid crystal molecules 106 are arranged in such a way of being substantially perpendicular to surfaces of upper and lower glass substrates 102, 100. An ITO slit 101 is formed in a TFT side of the lower glass substrate 100, while ITO 104 of the upper glass substrate 102 is intact. A certain amount of monomer, which when irradiated by ultraviolet light, carries out a polymerization reaction, is added to the liquid crystal material, and this is referred to as reactive mesogen (RM) 108. After an assembling operation is performed by having liquid crystal dropping onto the liquid crystal panel, a signal having proper frequency, waveform, or voltage is applied to the panel to cause the liquid crystal molecules to tilt in a predetermined direction. Meanwhile, ultraviolet light is applied to irradiate the panel to cause the RM 108 polymerized and forming a polymer deposited on the surfaces of the upper and lower glass substrates 102, 100. This polymer deposition formed through the polymerization is referred to as polymer bumps 110, which provide the liquid crystal molecules 106 with a pre-tilt angle with no voltage applied thereto. This helps increasing the response speed of the liquid crystal molecules. An advantage of using the technique is that multi-angle alignment (generating pre-tilt angles) in the panel can be realized.

Figure 2:
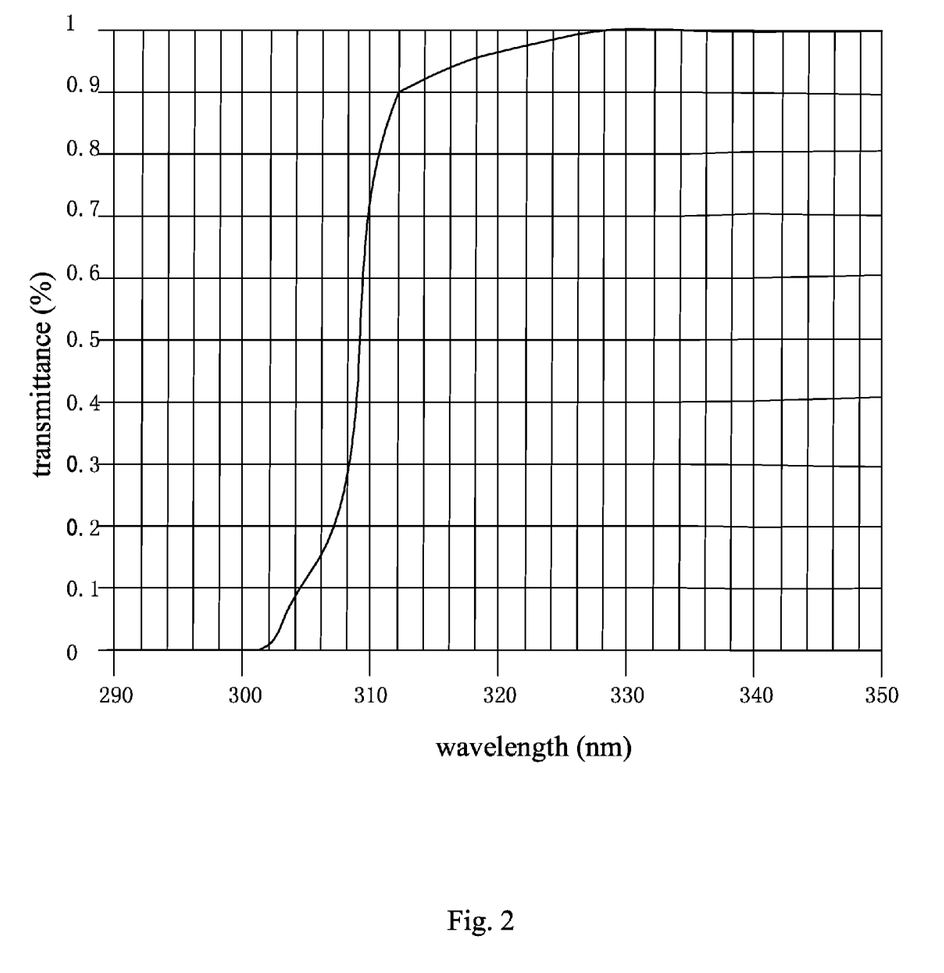
FIG. 2 is a plot showing relationship between transmittance of liquid crystal material and wavelength of ultraviolet light when the ultraviolet light is irradiated to a liquid crystal display panel.

Photo reactive groups contained in the reactive mesogens used in PSVA technique are usually methacrylate, acrylate, ethenyl, ethyleneoxy or epoxy groups, among which methacrylate is the most commonly used one. The primary wavelength range of ultraviolet light that is applied to cause photopolymerization of the reactive mesogens of these functional groups is 200-300 nm. Although such reaction of the reactive mesogens may occur for ultraviolet light having a wavelength greater than 300 nm, yet the efficiency is extremely poor and the speed is low, making it poor in mass productivity. Consequently, it is necessary to use a light having a wavelength less than 300 nm to irradiate a panel for causing reaction of the reactive mesogens. However, a number of drawbacks and difficulties may be caused for the manufacture of panels if light of a wavelength less than 300 nm is used. Firstly, ultraviolet light having a wavelength less than 300 nm has higher energy, which may cause degradation and damage of polyimide that makes an alignment layer and the vertical alignment liquid crystal molecules used in this technique, leading to reduced VHR (Voltage Holding Ratio) of the panel, severe image sticking, and worsened result of reliability analysis (RA). Secondly, glass that is used to make upper and lower glass substrate of an LCD shows certain absorption of ultraviolet lights having wavelength less than 300 nm, causing deterioration of light irradiation efficiency. It is even worse that the liquid crystal material itself shows strong absorption of ultraviolet light having a wavelength less than 300 nm, as illustrated in the ultraviolet transmission spectrum of liquid crystal shown in FIG. 2. It can be found that ultraviolet light having a wavelength less than 300 nm is generally completely blocked from transmitting through the liquid crystal material. In other words, most of the ultraviolet light emitting from a light source is absorbed by the liquid crystal material (causing damage) and only a minor portion of the ultraviolet light is absorbed by the reactive mesogens to induce polymerization reaction. This occurs in a very shallow position at the light incidence side. This will cause inhomogeneous reaction of reactive mesogens between the light incidence side and the opposite back side, leading to worsened alignment effect of the panel.

SUMMARY OF THE INVENTION

An object of the present invention is to provide a liquid crystal medium composition, which comprises a sensitizer that converts the primary wavelength range of ultraviolet light for reaction of polymerizable monomer from 200-300 nm to 300-450 nm, staying away from the absorption band of the liquid crystal material, thereby heighten reaction efficiency and homogeneity of the polymerizable monomer.

Another object of the present invention is to provide a liquid crystal display panel that is manufactured with the above liquid crystal medium composition, wherein since the wavelength of the ultraviolet light used in the polymer stabilized vertical alignment technique is increased, damage caused on the liquid crystal material and alignment material of polyimide is reduced thereby improving quality and lifespan of liquid crystal display panel.

To achieve the objects, the present invention provides a liquid crystal medium composition, which comprises: a negative type liquid crystal material, a polymerizable monomer, a sensitizer, and stabilizer. The sensitizer is an organometallic complex that has an amount of 0.01%-5% of total mass of the liquid crystal composition and has a strong absorption of ultraviolet light having a wavelength of 300-450 nm. The sensitizer comprises one or more sensitizers represented by the following formula:

Formula I wherein in the formula, M represents central atom that is a metal atom and is specifically Ru, Os, Pt, Cu, Fe, Zn, or Ti; ED, ring Z1, and ring Z2 are organic ligand or coordination molecule; n1, n2, and n3 are integers of 0-8; ED is S=C=N—, NC—, or R—S—, R of R—S— is H atom or C1-12 linear or branched alkyl, one or more of non-adjacent $CH_2$ of the linear or branched alkyl is substitutable by O atom; ring Z1 represents a five-membered heterocyclic ligand, in which X is heteroatom and is specifically one or more of N, O, and S, ring Z1 is a saturated structure, an unsaturated structure, or a five-membered heterocyclic ring containing aromatic ring, R1 represents a substituted moiety on the ring Z1, which is H, or C1-12 linear alkyl or branched alkyl, in which one or more of non-adjacent $CH_2$ on the linear alkyl or branched alkyl is substitutable by O atom, substituted moiety R1 comprises other ring structures containing heteroatom, k1 is the number of substituted moiety $R_1$, which is an integral of 0-5; ring Z2 represents a six-membered heterocyclic ligand, wherein, Y is heteroatom, that is substantially one or more of N, O, and S, ring Z2 is a six-membered heterocyclic ligand, in which Y is heteroatom and is specifically one or more of N, O, and S, ring Z2 being a saturated structure, an unsaturated structure, or a six-membered heterocyclic ring containing aromatic ring, $R_2$ represents a substituted moiety on the ring Z2, which is H, or C1-12 linear alkyl or branched alkyl, in which one or more of non-adjacent $CH_2$ on the linear alkyl or branched alkyl is substitutable by O atom, substituted moiety $R_2$ comprises other ring structures containing heteroatom, k2 is the number of substituted moiety $R_2$, which is an integral of 0-5.

The polymerizable monomer reacts with ultraviolet light having a wavelength of 300-450 nm.

The negative type liquid crystal material comprises at least one liquid crystal compound represented by the following formula:

Formula II wherein in the formula, is

X represents substituted moieties bound to ring structures, n is an integral of 1-4, n being identical or different for different ring structures, n>1 indicating an individual ring structure has a plurality of substituted moieties X that are identical or different, X being —H, —F, —Cl, —Br, —I, —CN, or —$NO_2$; $Y_1$ and $Y_2$ are —R, —O—R, —CO—R, —OCO—R, —COO—R, or —$(OCH_2CH_2)_{n_1}CH_3$, R representing a C1-12 linear or branched alkyl, $n_1$ being an integral of 1-5, $Y_1$ and $Y_2$ being identical or different.

The polymerizable monomer comprises at least one polymerizable compound represented by the following formula:

Formula III wherein $P_1$ and $P_2$ represent polymerizable moieties which are identical or different and are methacrylate, acrylate, ethenyl, ethyleneoxy or epoxy groups; $L_1$ and $L_2$ represent linking moieties which are identical or different and are —C—C—, —O—, —COO—, —OCO—, —$CH_2O$—, —$OCH_2O$—, —$O(CH_2)_2O$—, —$COCH_2$— or methylenyl; X represents a core moiety which is wherein X represents substituted moieties bound to the rings, n is an integral of 1-4, multiple values of n in any above formula being identical or different, n>1 indicating an individual ring structure has a plurality of substituted moieties X that are identical or different, the substituted moiety represented by X is: —H, —F, —Cl, —Br, —I, —CN or —$NO_2$.

The stabilizer comprises at least one stabilizer compound represented by the following formula:

wherein $R_1$ represents a C1-9 linear or branched alkyl, n is an integral of 1-4, n>1 indicates an individual benezene ring structure has a plurality of substituted moieties $R_1$ which are identical or different; $R_2$ represents a C1-36 linear or branched alkyl; L is —C—C—, —O—, —COO—, —OCO—, —$CH_2O$—, —$OCH_2O$—, —$O(CH_2)_2O$—, —$COCH_2$— or methylenyl.

The negative type liquid crystal material has an amount of 90%-99% of the total mass of the liquid crystal medium composition, the polymerizable monomer having an amount of 0.1%-5% of the total mass of the liquid crystal medium composition, the sensitizer having an amount of 5 ppm-1000 ppm of the total mass of the liquid crystal medium composition, the stabilizer having an amount of 5 ppm-500 ppm of the total mass of the liquid crystal medium composition.

The polymerizable monomer has an amount of 0.1%-1% of the total mass of the liquid crystal medium composition.

The present invention also provides a liquid crystal medium composition, which comprises: a negative type liquid crystal material, a polymerizable monomer, a sensitizer, and stabilizer; the sensitizer being an organometallic complex that has an amount of 0.01%-5% of total mass of the liquid crystal composition and has a strong absorption of ultraviolet light having a wavelength of 300-450 nm, the sensitizer comprises one or more sensitizers represented by the following formula:

Formula I wherein in the formula, M represents central atom that is a metal atom and is specifically Ru, Os, Pt, Cu, Fe, Zn, or Ti; ED, ring Z1, and ring Z2 are organic ligand or coordination molecule; n1, n2, and n3 are integers of 0-8; ED is S=C=N—, NC—, or R—S—, R of R—S— is H atom or C1-12 linear or branched alkyl, one or more of non-adjacent $CH_2$ of the linear or branched alkyl is substitutable by O atom; ring Z1 represents a five-membered heterocyclic ligand, in which X is heteroatom and is specifically one or more of N, O, and S, ring Z1 is a saturated structure, an unsaturated structure, or a five-membered heterocyclic ring containing aromatic ring, R1 represents a substituted moiety on the ring Z1, which is H, or C1-12 linear alkyl or branched alkyl, in which one or more of non-adjacent $CH_2$ on the linear alkyl or branched alkyl is substitutable by O atom, substituted moiety R1 comprises other ring structures containing heteroatom, k1 is the number of substituted moiety $R_1$, which is an integral of 0-5; ring Z2 represents a six-membered heterocyclic ligand, wherein, Y is heteroatom, that is substantially one or more of N, O, and S, ring Z2 is a six-membered heterocyclic ligand, in which Y is heteroatom and is specifically one or more of N, O, and S, ring Z2 being a saturated structure, an unsaturated structure, or a six-membered heterocyclic ring containing aromatic ring, $R_2$ represents a substituted moiety on the ring Z2, which is H, or C1-12 linear alkyl or branched alkyl, in which one or more of non-adjacent $CH_2$ on the linear alkyl or branched alkyl is substitutable by O atom, substituted moiety $R_2$ comprises other ring structures containing heteroatom, k2 is the number of substituted moiety $R_2$, which is an integral of 0-5;

wherein the polymerizable monomer reacts with ultraviolet light having a wavelength of 300-450 nml;

wherein the negative type liquid crystal material comprises at least one liquid crystal compound represented by the following formula:

Formula II wherein in the formula, is

X represents substituted moieties bound to ring structures, n is an integral of 1-4, n being identical or different for different ring structures, n>1 indicating an individual ring structure has a plurality of substituted moieties X that are identical or different, X being —H, —F, —Cl, —Br, —I, —CN, or —$NO_2$; $Y_1$ and $Y_2$ are —R, —O—R, —CO—R, —OCO—R, —COO—R, or —$(OCH_2CH_2)_{n_1}CH_3$, R representing a C1-12 linear or branched alkyl, $n_1$ being an integral of 1-5, $Y_1$ and $Y_2$ being identical or different;

wherein the polymerizable monomer comprises at least one polymerizable compound represented by the following formula:

$$P_1\text{-}L_1\text{-}X\text{-}L_2P_2 \qquad \text{Formula III}$$

wherein $P_1$ and $P_2$ represent polymerizable moieties which are identical or different and are methacrylate, acrylate, ethenyl, ethyleneoxy or epoxy groups; $L_1$ and $L_2$ represent linking moieties which are identical or different and are —C—C—, —O—, —COO—, —OCO—, —$CH_2$O—, —O$CH_2$—, —O$(CH_2)_2$O—, —COCH$_2$— or methylenyl; X represents a core moiety which is wherein X represents substituted moieties bound to the rings, n is an integral of 1-4, multiple values of n in any above formula being identical or different, n>1 indicating an individual ring structure has a plurality of substituted moieties X that are identical or different, the substituted moiety represented by X is: —H, —F, —Cl, —Br, —I, —CN or —$NO_2$;

wherein the stabilizer comprises at least one stabilizer compound represented by the following formula:

wherein $R_1$ represents a C1-9 linear or branched alkyl, n is an integral of 1-4, n>1 indicates an individual benezene ring structure has a plurality of substituted moieties $R_1$ which are identical or different; $R_2$ represents a C1-36 linear or branched alkyl; L is —C≡C—, —O—, —COO—, —OCO—, —CH₂O—, —OCH₂O—, —O(CH₂)₂O—, —COCH₂— or methylenyl;

wherein the negative type liquid crystal material has an amount of 90%-99% of the total mass of the liquid crystal medium composition, the polymerizable monomer having an amount of 0.1%-5% of the total mass of the liquid crystal medium composition, the sensitizer having an amount of 5 ppm-1000 ppm of the total mass of the liquid crystal medium composition, the stabilizer having an amount of 5 ppm-500 ppm of the total mass of the liquid crystal medium composition; and wherein the polymerizable monomer has an amount of 0.1%-1% of the total mass of the liquid crystal medium composition.

The present invention further provides a liquid crystal display panel manufactured with the liquid crystal medium composition discussed above and comprising a first substrate, a second substrate opposite to the first substrate and located above the first substrate, and the liquid crystal medium composition interposed between the first substrate and the second substrate.

The first substrate comprises a data line, a gate line, a TFT array, an ITO pixel electrode, and a first polyimide alignment layer disposed thereon.

The second substrate comprises a black matrix, a color filter film having red, green and blue sub-pixels, a common electrode, a second polyimide alignment layer, and a spacer maintaining spacing between the first substrate and second substrate.

The efficacy of the present invention is that the present invention provides a liquid crystal medium composition comprising a sensitizer. The sensitizer converts the primary wavelength range of ultraviolet light for reaction of polymerizable monomer from 200-300 nm to 300-450 nm, staying away from the absorption band of the liquid crystal material, thereby heightening reaction efficiency and homogeneity of the polymerizable monomer. The present invention uses the above liquid crystal medium composition to manufacture a liquid crystal display panel, where the ultraviolet light used has a range of wavelength of 300-450 nm, which helps making the polymerizable monomer highly effectively and fact react and at the same time reduces damage caused on the liquid crystal material and alignment material of polyimide by the ultraviolet light thereby improving quality, lifespan, and reliability of liquid crystal display panel.

For better understanding of the features and technical contents of the present invention, reference will be made to the following detailed description of the present invention and the attached drawings. However, the drawings are provided for the purposes of reference and illustration and are not intended to impose undue limitations to the present invention.

BRIEF DESCRIPTION OF THE DRAWINGS

The technical solution, as well as beneficial advantages, of the present invention will be apparent from the following detailed description of an embodiment of the present invention, with reference to the attached drawings. In the drawings.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

The present invention provides a liquid crystal display panel, which comprises a first substrate, a second substrate opposite to the first substrate and located above the first substrate, and a liquid crystal medium composition interposed between the first substrate and the second substrate. The first substrate comprises a data line, a gate line, a TFT array, an ITO pixel electrode, and a first polyimide alignment layer disposed thereon. The second substrate comprises a black matrix, a color filter film having red, green and blue sub-pixels, a common electrode, a second polyimide alignment layer, and a spacer maintaining spacing between the first substrate and second substrate.

The liquid crystal medium composition according to the present invention comprising: a negative type liquid crystal material, a polymerizable monomer, a sensitizer, and stabilizer. The sensitizer being an organometallic complex that has an amount of 0.01%-5% of total mass of the liquid crystal composition. Further, the amount of the sensitizer added is of an amount of 5 ppm-1000 ppm of the total mass of the liquid crystal medium composition.

The sensitizer added in the liquid crystal medium composition of the present invention comprises a large group of substances, of which the characteristic is having strong absorption of ultraviolet light having a wavelength of 300-450 nm and actable with the polymerizable monomer contained in the liquid crystal medium to transfer the energy absorbed to the polymerizable monomer to cause polymerization reaction, achieving an effect of shifting the reacting wavelength of the polymerizable monomer to a longer wavelength. The sensitizer itself only has an effect of transferring energy, but does not participate in chemical reaction.

The sensitizer comprises one or more sensitizers represented by the following formula:

Formula I wherein in the formula, M represents central atom that is a metal atom and is specifically Ru, Os, Pt, Cu, Fe, Zn, or Ti; ED, ring Z1, and ring Z2 are organic ligand or coordination molecule; n1, n2, and n3 are integers of 0-8; ED is S=C=N—, NC—, or R—S—, R of R—S— is H atom or C1-12 linear or branched alkyl, one or more of non-adjacent CH₂ of the linear or branched alkyl is substitutable by O atom; ring Z1 represents a five-membered heterocyclic ligand, in which X is heteroatom and is specifically one or more of N, O, and S, ring Z1 is a saturated structure, an unsaturated structure, or a five-membered heterocyclic ring containing aromatic ring, R1 represents a substituted moiety on the ring Z1, which is H, or C1-12 linear alkyl or branched alkyl, in which one or more of non-adjacent CH₂ on the linear alkyl or branched alkyl is substitutable by O atom, substituted moiety R1 comprises other ring structures containing heteroatom, k1 is the number of substituted moiety $R_1$, which is an integral of 0-5; ring Z2 represents a six-membered heterocyclic ligand, wherein, Y is heteroatom, that is substantially one or more of N, O, and S, ring Z2 is a six-membered heterocyclic ligand, in which Y is heteroatom and is specifically one or more of N, O, and S, ring Z2 being a saturated structure, an unsaturated structure, or a six-membered heterocyclic ring containing aromatic ring, $R_2$ represents a substituted moiety on the ring Z2, which is H, or C1-12 linear alkyl or branched alkyl, in which one or more of non-adjacent $CH_2$ on the linear alkyl or branched alkyl is substitutable by O atom, substituted moiety $R_2$ comprises other ring structures containing heteroatom, k2 is the number of substituted moiety $R_2$, which is an integral of 0-5.

Addition of the sensitizer makes the primary wavelength range of ultraviolet light for reaction of the polymerizable monomer converting from 200-300 nm to 300-450 nm. In other words, after the first and second substrates and the liquid crystal medium composition are assembled, using a ultraviolet light having a wavelength of 300-450 nm to irradiate the panel from the first substrate side would cause the polymerizable monomer to react and form polymer bumps thereby achieving an effect of alignment. Such a process makes a highly effective and fast reaction of the polymerizable monomer and at the same time reduces damages caused on the liquid crystal material and alignment material by the ultraviolet light thereby improving reliability of liquid crystal display panel.

The negative type liquid crystal material comprises at least one liquid crystal compound represented by the following formula:

Formula II wherein in the formula, is

X represents substituted moieties bound to ring structures, n is an integral of 1-4, n being identical or different for different ring structures, n>1 indicating an individual ring structure has a plurality of substituted moieties X that are identical or different, X being —H, —F, —Cl, —Br, —I, —CN, or —$NO_2$; $Y_1$ and $Y_2$ are —R, —O—R, —CO—R, —OCO—R, —COO—R, or —$(OCH_2CH_2)n_1CH_3$, R representing a C1-12 linear or branched alkyl, $n_1$ being an integral of 1-5, $Y_1$ and $Y_2$ being identical or different.

In the instant embodiment, the amount of the negative type liquid crystal material is 90%-99% of the total mass of the liquid crystal medium composition.

The polymerizable monomer comprises at least one polymerizable compound represented by the following formula:

Formula III wherein $P_1$ and $P_2$ represent polymerizable moieties which are identical or different and are methacrylate, acrylate, ethenyl, ethyleneoxy or epoxy groups; $L_1$ and $L_2$ represent linking moieties which are identical or different and are —C—C—, —O—, —COO—, —OCO—, —$CH_2O$—, —$OCH_2O$—, —$O(CH_2)_2O$—, —$COCH_2$— or methylenyl; X represents a core moiety which is wherein X represents substituted moieties bound to the rings, n is an integral of 1-4, multiple values of n in any above formula being identical or different, n>1 indicating an individual ring structure has a plurality of substituted moieties X that are identical or different, the substituted moiety represented by X is: —H, —F, —Cl, —Br, —I, —CN or —$NO_2$.

In the instant embodiment, the amount of polymerizable monomer is 0.1%-5% of the total mass of the liquid crystal medium composition and is preferably 0.1%-1%.

The stabilizer comprises at least one stablizier compound represented by the following formula:

wherein $R_1$ represents a C1-9 linear or branched alkyl, n is an integral of 1-4, n>1 indicates an individual benezene ring structure has a plurality of substituted moieties $R_1$ which are identical or different; $R_2$ represents a C1-36 linear or branched alkyl; L is —C—C—, —O—, —COO—, —OCO—, —$CH_2O$—, —$OCH_2O$—, —$O(CH_2)_2O$—, —$COCH_2$— or methylenyl.

In the instant embodiment, the amount of the stabilizer added is 5 ppm-500 ppm of the total mass of the liquid crystal medium composition.

In the instant embodiment, the sensitizer has a molecular structure as follows:

and having an amount of 40 ppm.

Except sensitizer, in Embodiments 2-9, the remaining constituent components of the liquid crystal medium composition used and the structure of liquid crystal display panel are identical to those of the first embodiment. The molecular structure and the amount of content of the sensitizer used in Embodiments 2-9 are listed in the following Table 1:

| Embodiment | Molecular Structure of Sensitizer | Content |
|---|---|---|
| Embodiment 2 | | 50 ppm |
| Embodiment 3 | | 40 ppm |
| Embodiment 4 | | 70 ppm |
| Embodiment 5 | | 60 ppm |

-continued

| Embodiment | Molecular Structure of Sensitizer | Content |
|---|---|---|
| Embodiment 6 | Cu complex of tetracarboxy-bipyridine macrocycle (HOOC, COOH groups) | 100 ppm |
| Embodiment 7 | Zn porphyrin with three mesityl substituents and one thiophene-2-carboxylic acid group | 80 ppm |
| Embodiment 8 | Zn porphyrin with two phenyl substituents and one 4-carboxyphenyl group | 60 ppm |

| Embodiment | Molecular Structure of Sensitizer | Content |
|---|---|---|
| Embodiment 9 |  | 50 ppm |

In summary, the present invention provides a liquid crystal medium composition comprising a sensitizer. The sensitizer converts the primary wavelength range of ultraviolet light for reaction of polymerizable monomer from 200-300 nm to 300-450 nm, staying away from the absorption band of the liquid crystal material, thereby heightening reaction efficiency and homogeneity of the polymerizable monomer. The present invention uses the above liquid crystal medium composition to manufacture a liquid crystal display panel, where the ultraviolet light used has a range of wavelength of 300-450 nm, which helps making the polymerizable monomer highly effectively and fact react and at the same time reduces damage caused on the liquid crystal material and alignment material of polyimide by the ultraviolet light thereby improving quality, lifespan, and reliability of liquid crystal display panel.

Based on the description given above, those having ordinary skills of the art may easily contemplate various changes and modifications of the technical solution and technical ideas of the present invention and all these changes and modifications are considered within the protection scope of right for the present invention.

What is claimed is:
1. A liquid crystal medium composition, comprising: a negative liquid crystal material, a polymerizable monomer, a sensitizer, and stabilizer; the sensitizer being an organometallic complex that has an amount of 0.01%-5% of total mass of the liquid crystal composition and absorbing ultraviolet light having a wavelength of 300-450nm, the sensitizer comprises one or more sensitizers represented by the following formula:

Formula I wherein in the formula, M represents central atom that is a metal atom and is specifically Ru, Os, Pt, Cu, Fe, Zn, or Ti; ED, ring Z1, and ring Z2 are each an organic ligand or a coordination molecule with n1, n2, and n3 being integers of 0-8, but not all zero, wherein ED is selected from a group consisting of S=C=N—, NC—, and R—S—, where R of R—S— is H atom or C1-12 linear or branched alkyl, one or more of non-adjacent $CH_2$ of the linear or branched alkyl is substitutable by O atom; ring Z1 represents a five-membered heterocyclic ligand, which is selected from a group consisting of a saturated structure, an unsaturated structure, and a five-membered heterocyclic ring containing an aromatic ring and in which X is heteroatom and is specifically one or more of N, O, and S, R1 represents a substituted moiety on the ring Z1, which is H, or C1-12 linear alkyl or branched alkyl, in which one or more of non-adjacent $CH_2$ on the linear alkyl or branched alkyl is substitutable by O atom, substituted moiety R1 comprises other ring structures containing heteroatom, k1 is the number of substituted moiety $R_1$, which is an integral of 0-5; and ring Z2 represents a six-membered heterocyclic ligand, which is selected from a group consisting of a saturated structure, an unsaturated structure, or a six-membered heterocyclic ring containing aromatic ring and in which Y is heteroatom and is specifically one or more of N, O, and S, $R_2$ represents a substituted moiety on the ring Z2, which is H, or C1-12 linear alkyl or branched alkyl, in which one or more of non-adjacent $CH_2$ on the linear alkyl or branched alkyl is substitutable by O atom, substituted moiety $R_2$ comprises other ring structures containing heteroatom, k2 is the number of substituted moiety $R_2$, which is an integral of 0-5.

2. The liquid crystal medium composition as claimed in claim 1, wherein the polymerizable monomer reacts with ultraviolet light having a wavelength of 300-450nm.

3. The liquid crystal medium composition as claimed in claim 1, wherein the negative liquid crystal material comprises at least one liquid crystal compound represented by the following formula:

Formula II wherein in the formula, is

X represents substituted moieties bound to ring structures, n is an integral of 1-4, n being identical or different for different ring structures, n>1 indicating an individual ring structure has a plurality of substituted moieties X that are identical or different, X being —H, —F, —Cl, —Br, —I, —CN, or —$NO_2$; $Y_1$ and $Y_2$ are —R, —O—R, —CO—R, —OCO—R, —COO—R, or —$(OCH_2CH_2)_{n_1}CH_3$, R representing a C1-12 linear or branched alkyl, $n_1$ being an integral of 1-5, $Y_1$ and $Y_2$ being identical or different.

4. The liquid crystal medium composition as claimed in claim 1, wherein the polymerizable monomer comprises at least one polymerizable compound represented by the following formula:

$P_1$-$L_1$-X -$L_2$-$P_2$   Formula III wherein $P_1$ and $P_2$ represent polymerizable moieties which are identical or different and are methacrylate, acrylate, ethenyl, ethyleneoxy or epoxy groups; $L_1$ and $L_2$ represent linking moieties which are identical or different and are —C—C—, —O—, —COO—, —OCO—, —$CH_2O$—, —$OCH_2O$—, —$O(CH_2)_2O$—, —$COCH_2$— or methylenyl; X represents a core moiety which is wherein X represents substituted moieties bound to the rings, n is an integral of 1-4, multiple values of n in any above formula being identical or different, n>1 indicating an individual ring structure has a plurality of substituted moieties X that are identical or different, the substituted moiety represented by X is: —H, —F, —Cl, —Br, —I, —CN or —$NO_2$.

5. The liquid crystal medium composition as claimed in claim 1, wherein the stabilizer comprises at least one stabilizer compound represented by the following formula:

wherein $R_1$ represents a C1-9 linear or branched alkyl, n is an integral of 1-4, n>1 indicates an individual benezene ring structure has a plurality of substituted moieties $R_1$ which are identical or different; $R_2$ represents a C1-36 linear or branched alkyl; L is —C—C—, —O—, —COO—, —OCO—, —$CH_2O$—, —$OCH_2O$—, —$O(CH_2)_2O$—, —$COCH_2$— or methylenyl.

6. The liquid crystal medium composition as claimed in claim 1, wherein the negative liquid crystal material has an amount of 90%-99% of the total mass of the liquid crystal medium composition, the polymerizable monomer having an amount of 0.1%-5% of the total mass of the liquid crystal medium composition, the sensitizer having an amount of 5 ppm-1000 ppm of the total mass of the liquid crystal medium composition, the stabilizer having an amount of 5 ppm-500 ppm of the total mass of the liquid crystal medium composition.

7. The liquid crystal medium composition as claimed in claim 6, wherein the polymerizable monomer has an amount of 0.1%-1% of the total mass of the liquid crystal medium composition.

8. A liquid crystal medium composition, comprising: a negative liquid crystal material, a polymerizable monomer, a sensitizer, and stabilizer; the sensitizer being an organometallic complex that has an amount of 0.01%-5% of total mass of the liquid crystal composition and absorbing ultraviolet light having a wavelength of 300-450 nm, the sensitizer comprises one or more sensitizers represented by the following formula:

Formula I wherein in the formula, M represents central atom that is a metal atom and is specifically Ru, Os, Pt, Cu, Fe, Zn, or Ti; ED, ring Z1, and ring Z2 are each an organic ligand or a coordination molecule; n1, n2, and n3 being integers of 0-8, but not all zero, wherein ED is selected from a group consisting of S=C=N—, NC—, and R—S—, where R of R—S— is H atom or C1-12 linear or branched alkyl, one or more of non-adjacent $CH_2$ of the linear or branched alkyl is substitutable by O atom; ring Z1 represents a five-membered heterocyclic ligand, which is selected from a group consisting of a saturated structure an unsaturated structure, and a five-membered heterocyclic ring containing an aromatic ring and in which X is heteroatom and is specifically one or more of N, O, and S, R1 represents a substituted moiety on the ring Z1, which is H, or C1-12 linear alkyl or branched alkyl, in which one or more of non-adjacent $CH_2$ on the linear alkyl or branched alkyl is substitutable by O atom, substituted moiety R1 comprises other ring structures containing heteroatom, k1 is the number of substituted moiety $R_1$, which is an integral of 0-5; and ring Z2 represents a six-membered heterocyclic ligand, which is selected from a group consisting of a saturated structure, an unsaturated structure, or a six-membered heterocyclic ring containing aromatic ring and in which Y is heteroatom and is specifically one or more of N, O, and S, $R_2$ represents a substituted moiety on the ring Z2, which is H, or C1-12 linear alkyl or branched alkyl, in which one or more of non-adjacent $CH_2$ on the linear alkyl or branched alkyl is substitutable by O atom, substituted moiety $R_2$ comprises other ring structures containing heteroatom, k2 is the number of substituted moiety $R_2$, which is an integral of 0-5;

wherein the polymerizable monomer reacts with ultraviolet light having a wavelength of 300-450 nml;

wherein the negative liquid crystal material comprises at least one liquid crystal compound represented by the following formula:

Formula II wherein in the formula, is

X represents substituted moieties bound to ring structures, n is an integral of 1-4, n being identical or different for different ring structures, n>1 indicating an individual ring structure has a plurality of substituted moieties X that are identical or different, X being —H, —F, —Cl, —Br, —I, —CN, or —$NO_2$; $Y_1$ and $Y_2$ are —R, —O—R, —CO—R, —OCO—R, —COO—R, or —(OCH$_2$CH$_2$)n$_1$CH$_3$, R representing a C1-12 linear or branched alkyl, $n_1$ being an integral of 1-5, $Y_1$ and $Y_2$ being identical or different;

wherein the polymerizable monomer comprises at least one polymerizable compound represented by the following formula:

$$P_1\text{-}L_1\text{-}X\text{-}L_2\text{-}P_2 \qquad \text{Formula III}$$

wherein $P_1$ and $P_2$ represent polymerizable moieties which are identical or different and are methacrylate, acrylate, ethenyl, ethyleneoxy or epoxy groups; $L_1$ and $L_2$ represent linking moieties which are identical or different and are —C—C—, —O—, —COO—, —OCO—, —$CH_2$O—, —O$CH_2$—, —O($CH_2$)$_2$O—, —CO$CH_2$— or methylenyl; X represents a core moiety which is wherein X represents substituted moieties bound to the rings, n is an integral of 1-4, multiple values of n in any above formula being identical or different, n>1 indicating an individual ring structure has a plurality of substituted moieties X that are identical or different, the substituted moiety represented by X is: —H, —F, —Cl, —Br, —I, —CN or —$NO_2$;

wherein the stabilizer comprises at least one stabilizer compound represented by the following formula:

wherein $R_1$ represents a C1-9 linear or branched alkyl, n is an integral of 1-4, n>1 indicates an individual benezene ring structure has a plurality of substituted moieties $R_1$ which are identical or different; $R_2$ represents a C1-36 linear or branched alkyl; L is —C—C—, —O—, —COO—, —OCO—, —CH$_2$O—, —OCH$_2$O—, —O(CH$_2$)$_2$O—, —COCH$_2$— or methylenyl;

wherein the negative liquid crystal material has an amount of 90%-99% of the total mass of the liquid crystal medium composition, the polymerizable monomer having an amount of 0.1%-5% of the total mass of the liquid crystal medium composition, the sensitizer having an amount of 5 ppm-1000 ppm of the total mass of the liquid crystal medium composition, the stabilizer having an amount of 5 ppm-500 ppm of the total mass of the liquid crystal medium composition; and wherein the polymerizable monomer has an amount of 0.1%-1% of the total mass of the liquid crystal medium composition.

9. A liquid crystal display panel manufactured with the liquid crystal medium composition as claimed in claim 1, comprising a first substrate, a second substrate opposite to the first substrate and located above the first substrate, and the liquid crystal medium composition interposed between the first substrate and the second substrate.

10. The liquid crystal display panel as claimed in claim 9, wherein the first substrate comprises a data line, a gate line, a TFT array, an ITO pixel electrode, and a first polyimide alignment layer disposed thereon.

11. The liquid crystal display panel as claimed in claim 9, wherein the second substrate comprises a black matrix, a color filter film having red, green and blue sub-pixels, a common electrode, a second polyimide alignment layer, and a spacer maintaining spacing between the first substrate and second substrate.

* * * * *